United States Patent
Shimoda et al.

(10) Patent No.: US 6,369,809 B1
(45) Date of Patent: Apr. 9, 2002

(54) POWER SUPPLY CIRCUIT FOR LIQUID CRYSTAL DISPLAY

(75) Inventors: Sadashi Shimoda; Hiroshi Mukainakano, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/360,773

(22) Filed: Jul. 26, 1999

(30) Foreign Application Priority Data

Jul. 27, 1998 (JP) .......................................... 10-211221

(51) Int. Cl.[7] .................................................. G09G 5/00
(52) U.S. Cl. ........................................ 345/211; 323/271
(58) Field of Search ............................... 345/211, 212, 345/97, 94; 323/284, 285, 271, 268, 222, 272; 307/44, 45

(56) References Cited

U.S. PATENT DOCUMENTS

| | | | | |
|---|---|---|---|---|
| 5,317,332 A | * | 5/1994 | Kanno et al. ............ | 345/101 |
| 5,781,001 A | * | 7/1998 | Takemoto ................. | 323/267 |
| 5,841,412 A | * | 11/1998 | Ebihara ................... | 345/58 |
| 6,060,869 A | * | 5/2000 | Shimoda .................. | 323/271 |
| 6,081,131 A | * | 6/2000 | Ishii ....................... | 326/68 |

* cited by examiner

Primary Examiner—Bipin Shalwala
Assistant Examiner—Nitin Patel
(74) Attorney, Agent, or Firm—Adams & Wilks

(57) ABSTRACT

By supplying a positive power supply of the operational amplifier from a switching regulator using an input voltage of the operational amplifier as its reference voltage, even if the bias ratio is varied, the ratio of the positive power supply voltage of the operational amplifier to an output voltage of the operational amplifier is always constant, and thus, there is an effect that a liquid crystal display device with low power consumption can be implemented independently of the panel.

12 Claims, 4 Drawing Sheets

POWER SUPPLY CIRCUIT FOR LIQUID CRYSTAL DISPLAY

BACKGROUND OF THE INVENTION

The present invention relates to a power supply circuit for driving a liquid crystal display device.

As a conventional power supply circuit for driving a liquid crystal display device, a power supply circuit using a switching regulator as shown in a circuit diagram of FIG. 3 is known. More specifically, a switching regulator and a transformer are used to derive positive and negative power supplies necessary for a drive voltage.

SUMMARY OF THE INVENTION

In a liquid crystal display device using a driving method such as multiline addressing (MLA), as shown in FIG. 2, voltage relationships of VH, VL, and V1, which are drive voltages on a common side, must satisfy the equality VH−V1=V1−VL. If this equality is not satisfied, tailing and the like are caused, resulting in damage to the display quality. In a conventional power supply circuit, as shown in FIG. 3; a transformer generates positive and negative voltages. However, since it is hard to obtain a precise winding ratio of the transformer in the conventional power supply circuit, there arises the problem that the above equality is difficult to be satisfied.

A circuit shown in FIG. 4 has been proposed to solve this problem. A drive voltage on a segment side is created from the VH voltage by resistance dividing. Since the resistance value of a resistor used for dividing the voltage is high at this time, in case that the voltage is actually supplied to a liquid crystal panel, a buffer circuit having an amplification factor of 1 and using an operational amplifier is required between the dividing resistance and the liquid crystal panel. A voltage higher than the output voltage of the operational amplifier must be applied to a positive power supply of the operational amplifier. Here, the difference between the positive power supply voltage and the output voltage of the operational amplifier is the loss of the power supply circuit. If the difference in the voltage is large, the loss is accordingly large, which makes it difficult to implement a liquid crystal display device with low power consumption.

Further, there is also the following problem. That is, in a liquid crystal panel, both the common voltage and the segment voltage have to be varied according to the number of scanning lines. Therefore, the output voltage of the operational amplifier forming the buffer circuit varies according to the duty of the liquid crystal panel, and thus, in order to implement a liquid crystal display device with low power consumption, there is a problem in that the positive power supply voltage has to be changed according to the size of the panel.

In order to solve the above problems, according to the present invention, a power supply circuit for liquid crystal for dividing and inputting to a buffer circuit a voltage on a common side to be applied to a liquid crystal panel to generate a bias voltage on a segment side is formed such that the divided voltage on the common side is used as a reference voltage for a switching regulator, and an output voltage of the switching regulator is used as a positive power supply voltage of the buffer circuit.

DESCRIPTION OF THE PREFERRED EMBODIMENTS

According to the present invention, a power supply circuit for liquid crystal is provided with a first power supply circuit for generating a voltage on a common side of a liquid crystal panel, a voltage dividing circuit for dividing an output voltage of the first power supply circuit, a buffer circuit for outputting the voltage divided by the voltage dividing circuit as a bias voltage on a segment side of the liquid crystal panel, and a second power supply circuit using the voltage divided by the voltage dividing circuit as a reference voltage, wherein the buffer circuit is formed such that power is supplied thereto by the second power supply circuit.

Further, according to the present invention, a power supply circuit for liquid crystal is provided with a first power supply circuit for generating a voltage on a common side of a liquid crystal panel, a voltage dividing circuit for dividing an output voltage of the first power supply circuit to output first and second divided voltages, first and second buffer circuits for outputting the first and second voltages divided by the voltage dividing circuit as bias voltages on a segment side of the liquid crystal panel, and a second power supply circuit using one of the first and second voltages divided by the voltage dividing circuit as a reference voltage, wherein the first and second buffer circuits are formed such that power is supplied thereto by the second power supply circuit.

Figure 1:
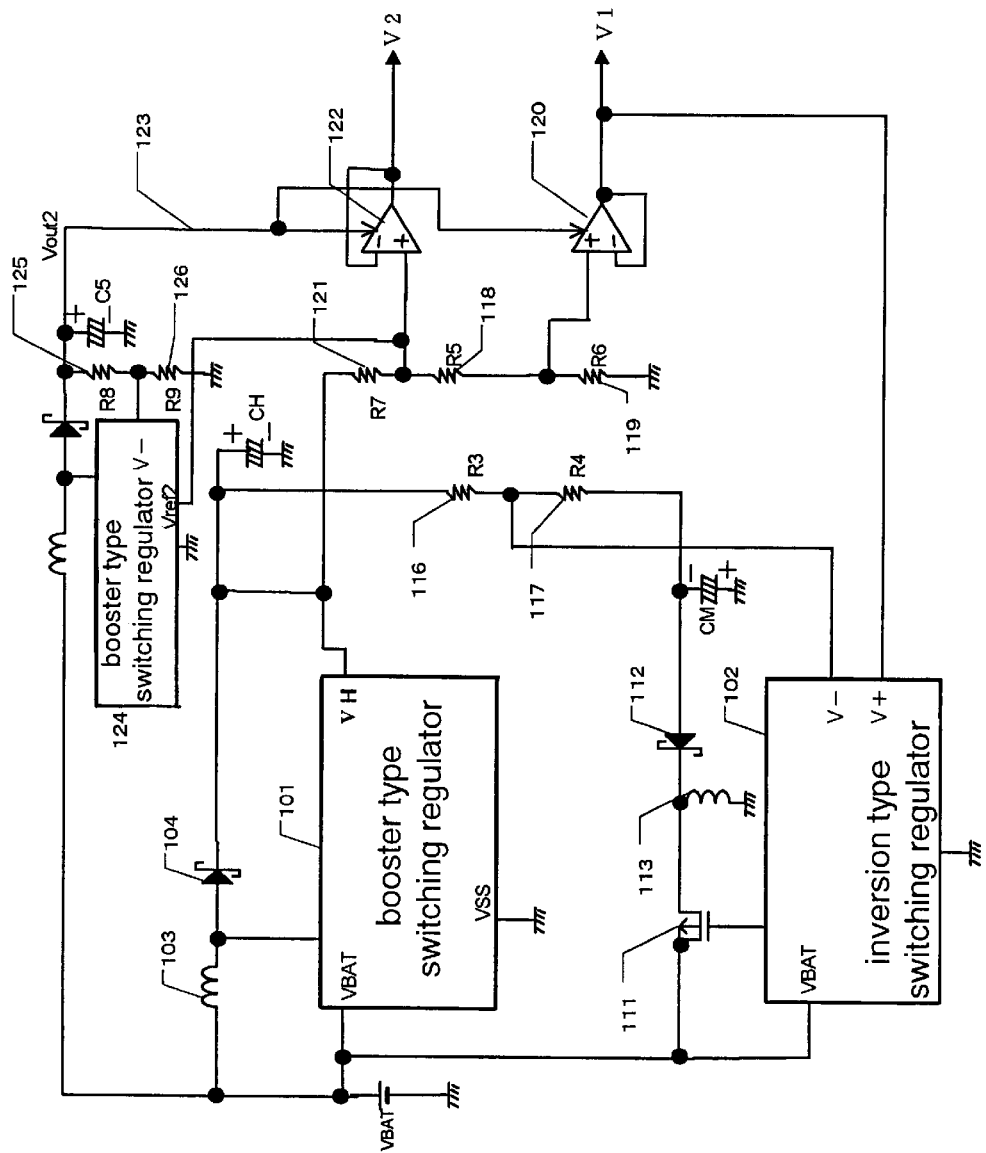
FIG. 1 is a block diagram of an embodiment of a power supply circuit for liquid crystal according to the present invention.
Figure 2:
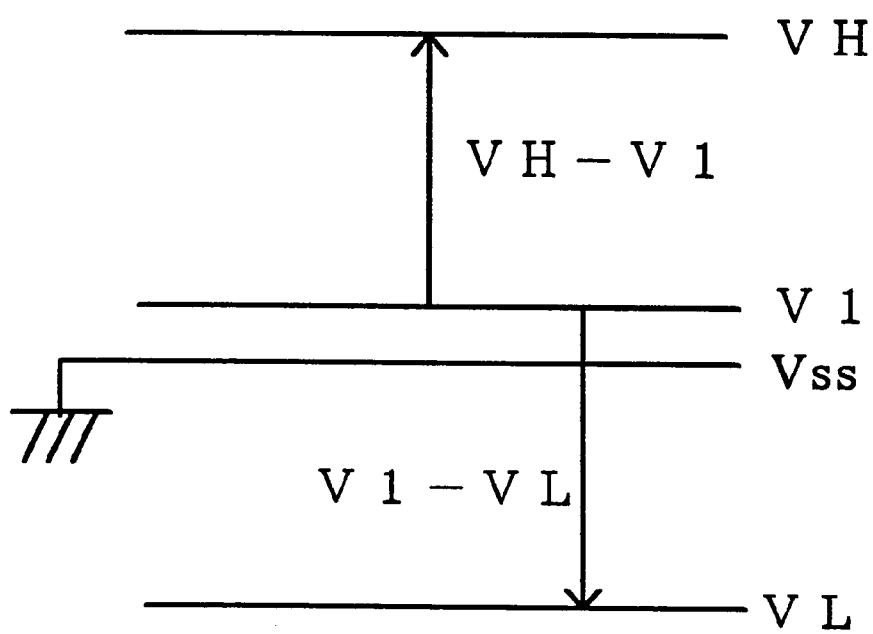
FIG. 2 is an explanatory view of a drive voltage on a common side.
Figure 3:
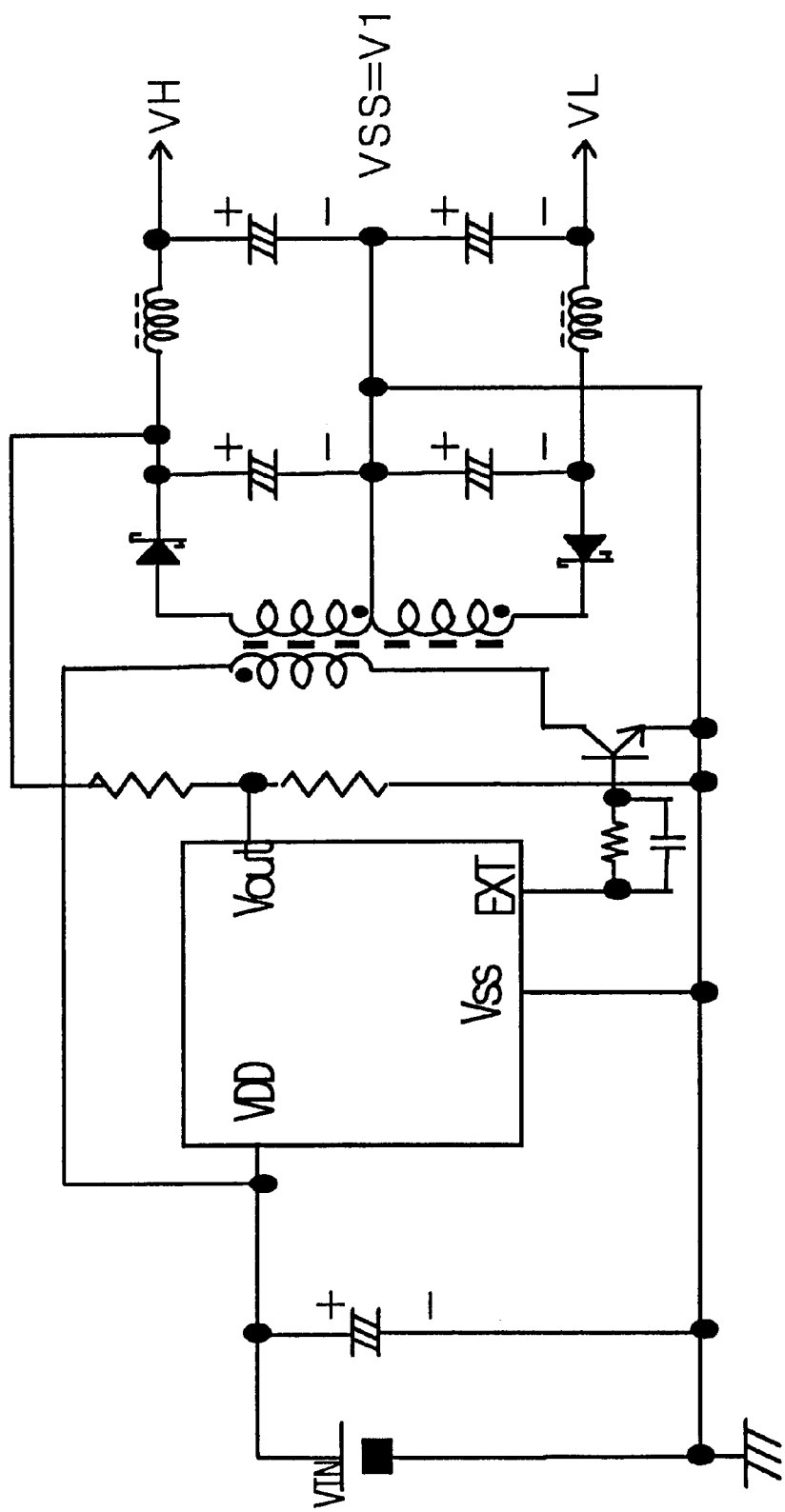
FIG. 3 is a circuit diagram of a conventional power supply circuit.

FIG. 1 is a block diagram of a power supply circuit for liquid crystal according to an embodiment of the present invention. In the structure shown in this block diagram, a booster type switching regulator 101 and an inversion type switching regulator 102 have the same structure as those shown in FIG. 4. Voltages VH, V1, and VL shown in FIG. 2 are created by the booster type switching regulator 101 and the inversion type switching regulator 102. The voltages VH, V1, and VL are used as power supplies on a common side of the liquid crystal display device.

Figure 4:
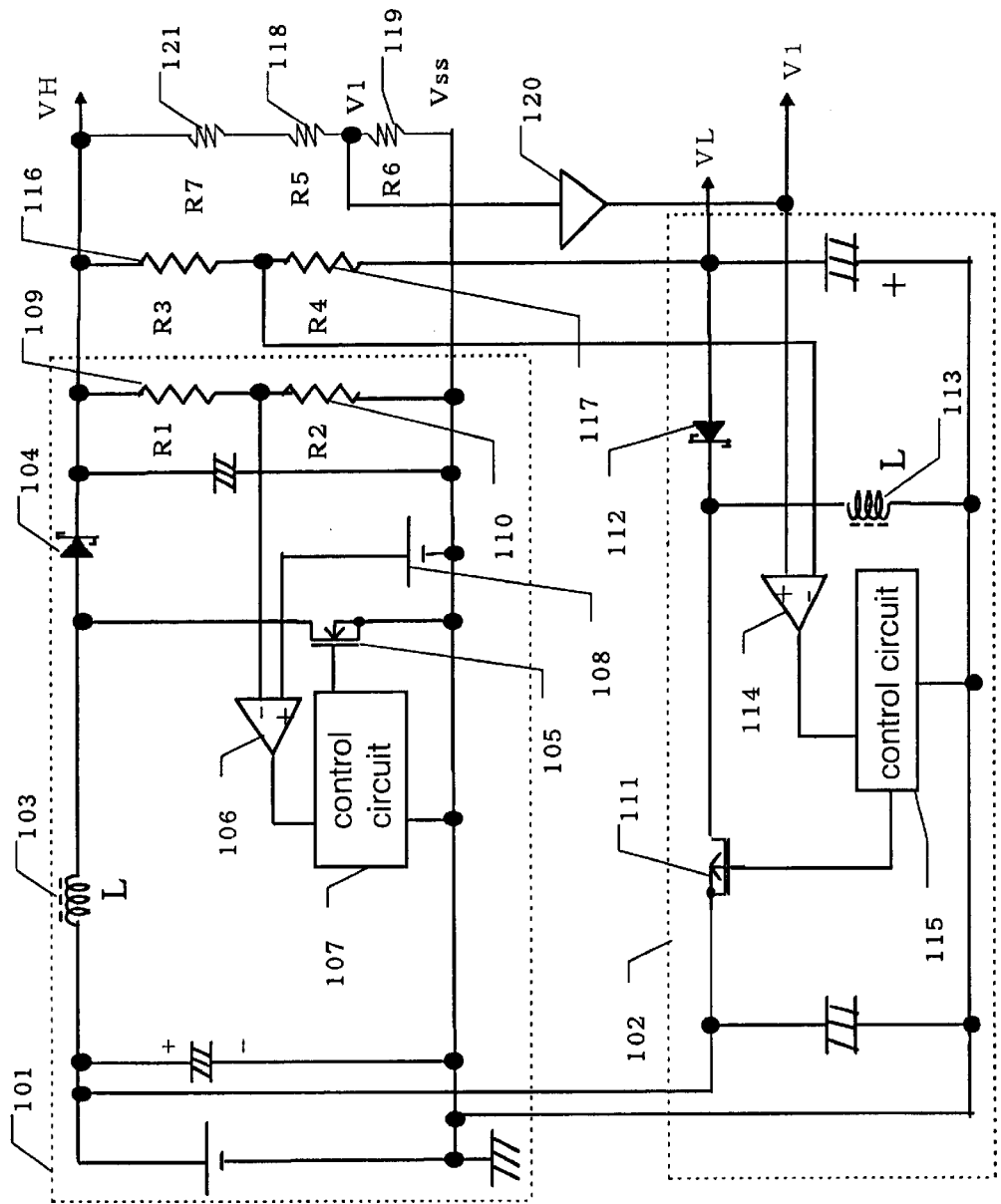
FIG. 4 is a circuit diagram detailedly illustrating a part of a power supply circuit for liquid crystal according to the present invention.

The booster type switching regulator 101 is formed of, as shown in FIG. 4, an FET 105, an error amplifier 106, a control circuit 107, a reference voltage 108, and feedback resistances 109 and 110. The booster chopper type switching regulator is formed together with an inductor 103 and a diode 104 as outside devices. Also, the inversion type switching regulator 102 is formed of an error amplifier 114, a control circuit 115, and feedback resistances 116 and 117. The inversion chopper type switching regulator is formed together with an FET 111, a diode 112, and an inductor 113 as outside devices. Further, the voltage VH is divided by dividing resistances 121, 118, and 119. The voltage V1 shown in FIG. 2 is created from a junction point between the dividing resistances 118 and 119 through a buffer circuit 120. Further, the voltage V1 is input to a terminal on a V+ side of the inversion type switching regulator 102.

In FIG. 1, the voltage at a junction point between the dividing resistances 121 and 118 is input to a buffer circuit 122 formed of an operational amplifier. Its output voltage is hereinafter referred to as V2. The output voltage V2 and the above-mentioned voltage V1 are used as power supplies on a segment side of the liquid crystal display device. A positive power supply 123 of the buffer circuits 120 and 122 is supplied from an output voltage Vout2 of a booster type switching regulator 124. The structure of the circuit of the booster type switching regulator 124 is the same as that of the booster type switching regulator 101, except that, instead of the reference voltage 108 in FIG. 4, a reference voltage Vref2 of the booster type switching regulator 124 is supplied from the junction point between the dividing resistances 121 and 118.

Next, the operation of the circuit is described. The voltage VH generated by the booster type switching regulator 101 is determined as Expression (1) by the voltage value Vref of the reference voltage 108, a resistance value R1 of the feedback resistance 109, and a resistance value R2 of the feedback resistance 110:

$$VH = Vref \cdot (R1+R2)/R2 \qquad (1)$$

Also, the voltage V1 is determined as Expression (2) by a resistance value R7 of the dividing resistance 121, a resistance value R5 of the dividing resistance 118, and a resistance value R6 of the dividing resistance 119:

$$V1 = VH \cdot R6/(R5+R6+R7) \qquad (2)$$

The voltage V1 is impedance-converted by the buffer 120, and the same voltage V1 is input to a + side terminal of the error amplifier 114. One end of the feedback resistance 116 is connected with the voltage VH. Thus, the voltage VL generated by the inversion type switching regulator 102 is determined as Expression (3):

$$VL = -(VH-V1) \cdot R4/R3 + V1 \qquad (3)$$

Here, R3 is a resistance value of the feedback resistance 116 and R4 is a resistance value of the feedback resistance 117. If setting is carried out to satisfy R3=R4, the voltage VL equals −VH+2V1. In other words, the equality VH−V1=V1−VL can be satisfied.

Next, in FIG. 1, the reference voltage of the booster type switching regulator 124 is the voltage at the junction point between the dividing resistances 121 and 118. Accordingly, the voltage Vref2 is expressed as Expression (4):

$$Vref2 = VH \cdot (R5+R6)/(R5+R6+R7) \qquad (4)$$

Further, the voltage value of the output Vout2 of the booster type switching regulator 124, i.e., the positive power supply 123 of the operational amplifier is expressed as Expression (5):

$$V123 = Vref2 \cdot (R8+R9)/R9 \qquad (5)$$

Here, dividing resistances 125 and 126 are, similarly to the dividing resistances 109 and 110 in FIG. 4, feedback resistances for determining the voltage Vout2. Since the output voltage V2 of the buffer circuit 122 having the amplification factor of 1 equals Vref2, Expression (5) is expressed as follows:

$$V123 = V2 \cdot (R8+R9)/R9 \qquad (6)$$

This means that the voltage V123 is the voltage V2 multiplied by (R8+R9)/R9. In other words, according to the present invention, the ratio of the positive power supply voltage of the operational amplifier to the voltage V2 can be made always constant. Even if the voltage V2 is varied depending on the liquid crystal panel, the positive power supply voltage V123 of the operational amplifier is always set automatically to the voltage multiplied by (R8+R9)/R9.

Further, even in case that the voltage V2 has to be changed due to ambient temperature change, according to the present embodiment, as expressed by Expression (6), the voltage V123 is also changed automatically.

Though the positive power supply of the operational amplifier of the buffer circuit 120 may be V123 as shown in FIG. 1, if a voltage VBAT is higher than the voltage V1, the positive power supply of the operational amplifier may be VBAT to achieve still lower power consumption. Further, even if the reference voltage of the booster type switching regulator 124 is the voltage at the junction point between the dividing resistances 118 and 119, similar effects can be obtained. In this case, Expression (6) is changed as follows:

$$V123 = V1 \cdot (R8+R9)/R9 \qquad (7)$$

Note that the values of R8 and R9 in Expression (6) and those in Expression (7) are not the same.

Further, though the description has been made in case that the reference voltage of the booster type switching regulator 124 is either the voltage V1 or the voltage V2 as an example, the gist of the present invention is that, if the reference voltage is a divided voltage of the voltage VH voltage as the voltage on the common side, the value of the reference voltage may be any value. For example, R7 of the resistance 121 may be divided into two to use the voltage at the junction point as the reference voltage Vref2 of a booster type switching regulator.

In the present embodiment, though the description has been made in case that a chopper type switching regulator using an inductor is used as the switching regulator 124, the present invention is not limited thereto, and it is clear that similar effects can be obtained with, for example, a voltage-controlled charging pump type switching regulator.

According to the present invention, in case that a bias voltage on a segment side is created with a buffer circuit using an operational amplifier, by supplying a positive power supply of the operational amplifier from a switching regulator using an input voltage of the operational amplifier as its reference voltage, even if the bias ratio is varied, the ratio of the positive power supply voltage of the operational amplifier to an output voltage of the operational amplifier is always constant, and thus, there is an effect that a liquid crystal display device with low power consumption can be implemented independently of the panel.

What is claimed is:

1. A power supply circuit for a liquid crystal panel, comprising: a power supply for producing a power supply voltage applied to a common side of the liquid crystal panel; a voltage dividing circuit for dividing the power supply voltage and outputting a divided voltage; a buffer circuit for receiving the divided voltage and outputting a bias voltage supplied to a segment side of the liquid crystal panel; and a switching regulator for producing an output voltage; wherein the divided voltage is used as a reference voltage for the switching regulator and an output voltage of the switching regulator is used as a positive power supply voltage of the buffer circuit.

2. A power supply circuit for a liquid crystal panel according to claim 1; wherein the power supply comprises a boosting type switching regulator and an inversion type switching regulator.

3. A power supply circuit for a liquid crystal panel according to claim 1; wherein the power supply produces three output voltages VH, V1 and VL, wherein VH−V1=V1−VL.

4. A power supply circuit for a liquid crystal panel according to claim 1; wherein the voltage dividing circuit comprises a resistor divider network.

5. A power supply circuit for a liquid crystal panel, comprising:
- a first power supply circuit for generating an output voltage supplied to a common side of the liquid crystal panel;
- a voltage dividing circuit for dividing an output voltage of the first power supply circuit and producing a divided output voltage;
- a buffer circuit for receiving the divided output voltage output by the voltage dividing circuit and outputting a bias voltage to a segment side of the liquid crystal panel; and
- a second power supply circuit for producing an output voltage and having the divided output voltage divided by the voltage dividing circuit as a reference voltage;
    - wherein a power supply input of the buffer circuit receives the output voltage of the second power supply circuit.

6. A power supply circuit for a liquid crystal panel according to claim 5; wherein the first power supply circuit comprises a boosting type switching regulator and an inversion type switching regulator.

7. A power supply circuit for a liquid crystal panel according to claim 5; wherein the second power supply circuit comprises a switching regulator.

8. A power supply circuit for a liquid crystal panel according to claim 5; wherein the first power supply produces three output voltages VH, V1 and VL, wherein VH−V1=V1−VL.

9. A power supply circuit for a liquid crystal panel, comprising:
- a first power supply circuit for generating an output voltage supplied to a common side of the liquid crystal panel;
- a voltage dividing circuit for dividing an output voltage of the first power supply circuit and outputting first and second divided voltages;
- first and second buffer circuits for receiving the first and second divided voltages output by the voltage dividing circuit and outputting bias voltages to a segment side of the liquid crystal panel; and
- a second power supply circuit for producing an output voltage and having one of the first and second divided voltages output by the voltage dividing circuit as a reference voltage;
    - wherein a power supply input of first and second buffer circuits receives the output voltage of the second power supply circuit.

10. A power supply circuit for a liquid crystal panel according to claim 9; wherein the first power supply circuit comprises a boosting type switching regulator and an inversion type switching regulator.

11. A power supply circuit for a liquid crystal panel according to claim 9; wherein the second power supply circuit comprises a switching regulator.

12. A power supply circuit for a liquid crystal panel according to claim 9; wherein the first power supply produces three output voltages VH, V1 and VL, wherein VH−V1=V1−VL.

* * * * *